United States Patent [19]

Freck et al.

[11] 4,004,971

[45] Jan. 25, 1977

[54] GAS COOLED NUCLEAR REACTORS

[75] Inventors: David Vernon Freck, Stroud; John Anthony Hall, Thornbury, both of England

[73] Assignee: Central Electricity Generating Board, London, England

[22] Filed: Aug. 19, 1974

[21] Appl. No.: 498,565

[30] Foreign Application Priority Data

Aug. 21, 1973 United Kingdom ............ 39392/73

[52] U.S. Cl. .................................. 176/37; 176/38; 176/61; 176/84

[51] Int. Cl.² ...................... G21C 5/00; G21C 9/32

[58] Field of Search .................. 176/37, 38, 68, 87, 176/84, 61, 64; 55/387, 522, 523; 210/502, 510

[56] References Cited

UNITED STATES PATENTS

| | | | |
|---|---|---|---|
| 3,010,889 | 11/1961 | Fortescue | 204/193.2 |
| 3,207,670 | 9/1965 | Fortescue et al. | 176/37 |
| 3,219,538 | 11/1965 | Glueckauf et al. | 176/37 |
| 3,252,869 | 5/1966 | Koutz | 176/68 |
| 3,274,070 | 9/1966 | Vanslager | 176/76 |
| 3,275,522 | 9/1966 | Kinsey et al. | 176/37 |

Primary Examiner—Samuel Feinberg
Assistant Examiner—Ralph Palo
Attorney, Agent, or Firm—Edward F. Connors

[57] ABSTRACT

In a gas cooled nuclear reactor, cesium metal release into the coolant gas is dependent on the coolant channel surface temperature in the core. The present invention relates to a filter for removing cesium from the coolant gas before it passes to the heat exchanger. The filter comprises a block or blocks of graphite having holes therein with a hydraulic diameter between 1 mm and 6 mm and a ratio of length to equivalent hydraulic diameter between 170 and 1000. This filter is arranged at one end of the reactor core so that the gases pass straight from the core into the filter block.

7 Claims, 8 Drawing Figures

GAS COOLED NUCLEAR REACTORS

BACKGROUND OF THE INVENTION

This invention relates to gas cooled nuclear reactors and is concerned more particularly with the construction of a coolant filter for the removal from the coolant gas of certain fission products.

The filter of the present invention is for the purpose of removing certain fission products, in particular cesium 137 from the coolant gas. As will be apparent from the following description, it will more generally serve as a filter for those radio-active species of molecular or atomic size which are absorbed by graphite at a high temperature. These include, in addition to cesium 137, strontium 90 and silver 110m.

Cesium metal release is dependent on the coolant channel surface temperature in the reactor core. The problem of cesium release therefore arises particularly with high temperature reactors. Removal of cesium from the coolant gases enables a designer to use a higher temperature and/or, provided the cesium is removed before the coolant is passed through energy extracting means to reduce the gamma exposure rate in the energy extracting means. The term "energy extracting means" used herein includes a heat exchanger and/or a turbine.

SUMMARY OF THE INVENTION

According to this invention, a filter for the coolant gas of a gas cooled nuclear reactor comprises a graphite body having holes therein with a hydraulic diameter greater than 1 mm and less than 6 mm and having a ratio of length to equivalent hydraulic diameter greater than 170 and less than 1000. The holes may be of any cross-section, and may for example be annuli. The hydraulic diameter of the hole is the ratio of four times the cross-sectional area of the hole to the wetted perimeter of the hole and is equal to the actual diameter in the case of a circular hole.

This filter is preferably situated at the outlet of the coolant from the core of a gas cooled reactor and is operated at the core exit coolant temperature. Thus, unlike conventional filters which are operated at the low temperature of the core inlet coolant gases which have passed through the energy extracting means the filter of the present invention substantially reduces activity levels in the coolant circuit, thereby facilitating inspection and repair of the energy extracting means and other out-of-core components.

With such a filter, fission products such as cesium 137 are deposited on and diffuse into the graphite of the filter. The rate of diffusion is dependent on the temperature of the graphite. It may be shown that the quantity held by the filter is a function of the temperature.

Since the filter can be situated immediately at the outlet of the core and so acquire substantially the temperature of the gas leaving the core, the gas is not cooled in passing through the filter.

In high temperature gas cooled reactors, it is the present practice to have vertical channels through the core through which the coolant passes. At the two ends of the core, graphite reflector blocks are provided and very conveniently the filter of the present invention is used in place of the graphite reflector block at the outlet end of the core, the block serving both as a conventional reflector and also as the filter. This filter however differs from conventional reflector blocks in that the channels for the coolant gas have the dimensions defined above and are therefore of very much smaller cross-section than the coolant channels such as have heretofore been provided through conventional reflector blocks.

The invention thus includes within its scope a gas cooled nuclear reactor having a core through which a coolant gas is passed and having a filter as described above situated at the gas outlet end of the core for filtering the coolant.

Thus according to another aspect of the invention, in a gas cooled nuclear reactor having a core assembly through which a coolant gas is passed and energy extracting means for extracting energy from said gas, there is provided a filter arranged so that the gas from the core passes through the filter before passing to said energy extracting means, which filter comprises a graphite body having holes therein with a hydraulic diameter between 0.001 and 0.006 meter and a ratio of length to hydraulic diameter between 170 and 1000.

It is impossible to construct a body filter as described above from individual blocks assembled in series and/or in parallel. It is readily possible to pass the whole of the coolant flow from the core through such an array of filters.

Because the passages through the filter blocks are smaller than the passages through the core, they will normally be made much more numerous so that the required coolant flow can be obtained without any substantial pressure drop. Thus, in a reactor, means may be provided at the interface between the core outlet and the filter block for the gas to pass from the core outlet into the various passages through the filter. For this purpose provision may be made for the gas to pass across the end face of the filter block. This may be done for example by providing a pattern of slots across the inlet face of the filter block or by spacing the filter block slightly away from the end of the core, for example by forming a land around the periphery of the filter block. Preferably, the dimensions of such slots or said land are sufficient to provide a greater hydraulic diameter than that of the holes in the filter block to avoid unnecessary pressure drop but, as explained above this hole diameter is between 1 and 6 mm and it is readily possible to mill slots of the required depth in the face of the graphite filter.

In a typical filter block, holes of 1.5 mm radius are employed, the filter being 1 m long and having a fractional free flow area greater than 0.227. Such a filter will give a decontamination factor of more than 10 for cesium 137. The decontamination factor is the ratio of the concentrations of the material under consideration e.g. cesium 137, in the coolant at the inlet and the outlet.

In a reactor in which the coolant flows downwardly through the core, the filter will be situated beneath the core and can form the core support.

If a cesium filter is to be effective, it must be able to retain any cesium it removes until it can be changed. The filter of the present invention may be incorporated as part of the fuel block structure in a reactor of the kind in which the fuel is incorporated in carbon blocks. In this case it may typically be changed after approximately three years. Alternatively the filter may remain in the core for the reactor lifetime. The retention of the cesium in the graphite depends on the effective diffusion coefficient for cesium. In practice the cesium deposited on the surface of the filter channel will quickly disperse and will be substantially uniformly distributed throughout the ligaments between the channels. The amount of cesium the filter can hold is a function of temperature. The capacity of the filter will vary markedly for different elements depending on the isotherm constant for adsorption of the element on graphite. Qualitatively, the capacity of the filter in mass units will be higher for strontium than for cesium and lower for silver than for cesium.

DESCRIPTION OF THE PREFERRED EMBODIMENTS

Figure 1:
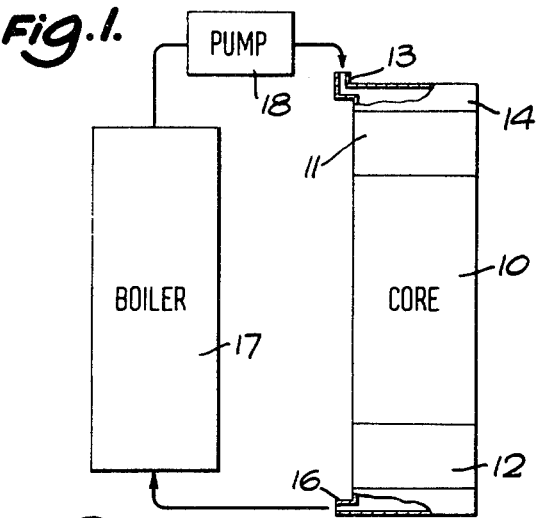
FIG. 1 is a diagram illustrating part of a gascooled nuclear reactor embodying the invention.

FIG. 1 illustrates diagrammatically part of a helium-cooled high temperature reactor operating at about 800° C reactor exit coolant temperature. The reactor core 10 shown diagrammatically in FIG. 1 comprises stacks of graphite blocks having vertically aligned coolant channels and having fuel pins within such channels or having fuel material incorporated in the graphite blocks. At the top and bottom ends of the core are graphite reflectors. In this reactor, the flow is downwards. The upper reflector comprises graphite blocks 11 with coolant passages. The lower reflector is formed by a graphite filter 12 which will be further described below.

The coolant gas enters through an inlet 13 into a header 14 above the top reflector and passes downwardly through the top reflector, the core 10 and the filter 12 to a further header 15 from whence it leaves via an outlet 16 to energy extracting means in the form of a steam raising boiler 17, or other heat exchanger and/or turbine, and is then recirculated to inlet 13 by pump 18. The present invention is concerned primarily with the filter 12 and no further description will be given of the reactor core which would, in the known way have suitable controls and would have side reflectors and be contained within a shield. Likewise, the boiler 17 and circulating pump 18 may be of known construction.

The graphite filter 12 is typically 1 meter high and has a plurality of vertical channels through it, formed by straight cylindrical holes typically of 3 mm diameter. The filter 12 may be formed of a number of separate graphite blocks arranged side by side and/or stacked. Its upper surface is milled to have a number of slots extending across it so as to permit of sideways flow of the coolant leaving the core channels so that the coolant is dispersed to flow through the more numerous filter channels. These slots thus constitute header means between the core channels and filter channels. The slots further give some protection against blocking of the filter channels by any particulate material dropping through the core channels.

Figure 2:
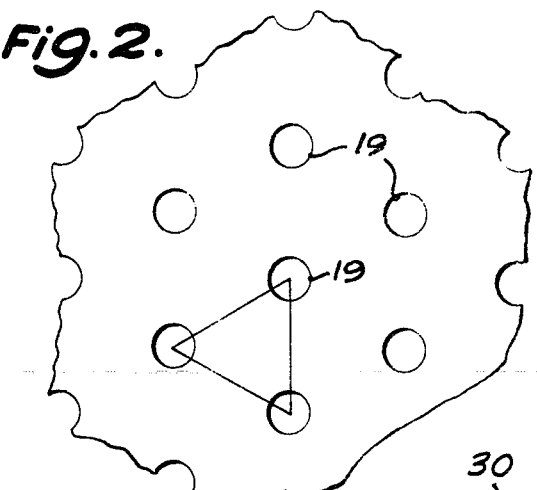
FIG. 2 is a plan view of part of a filter block for use in the embodiment of FIG. 1.

Referring to FIG. 2, which is a plan view of part of the top of the filter 12, the holes are shown as cylindrical holes 19 or radius $r$ and wall thickness $2t$. The ratio of $r$ to $t$ may vary over wide limits. If $r$ is equal to $t$, the free flow area of the filter structure is 0.227 of the total area of the structure. The pressure drop may be reduced by increasing the free flow area that is to say increasing the ratio of $r$ to $t$.

Figure 3:
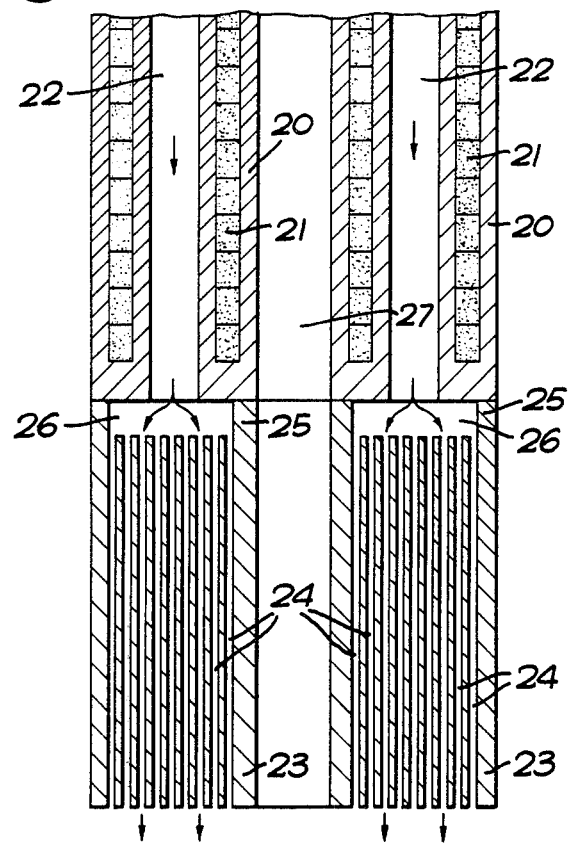
FIG. 3 shows a possible arrangement of the filter block beneath a fuel block.

FIG. 3 shows part of a filter below fuel blocks. In this particular embodiment, the core comprises blocks 20 having fuel elements 21 embedded therein and coolant channels 22. Below the core is an array of filter blocks 23 each having coolant channels 24 with a plurality of channels 24 for each coolant channel 22 in the core. The tops of the top filter blocks of the array are milled to leave a land 25 around a header region 26. FIG. 3 also shows a handling hole 27 extending through the core and filter assembly.

Figure 4:
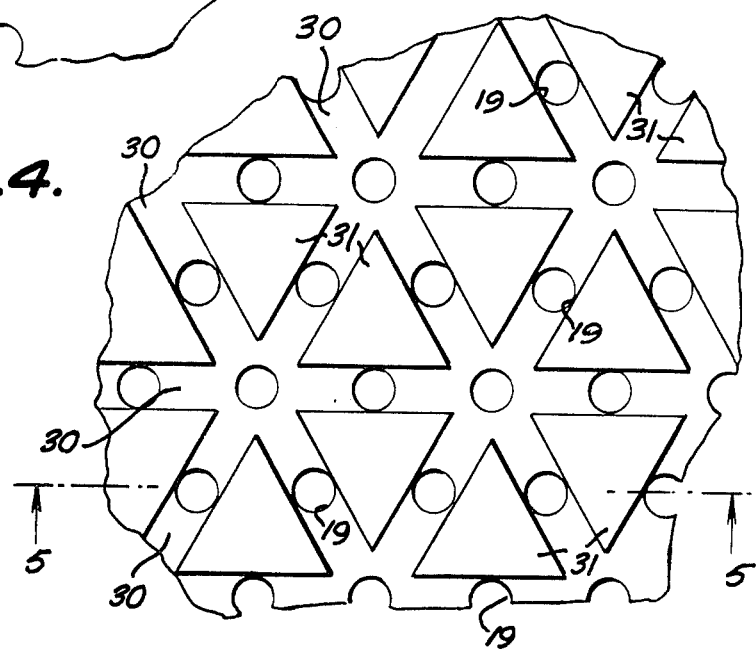
FIG. 4 is a plan view of part of another form of filter block.
Figure 5:
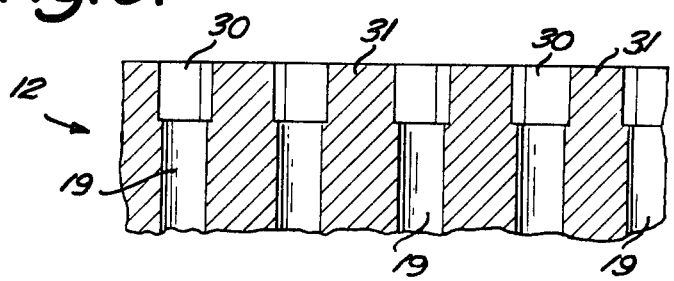
FIG. 5 is a part section along the line 5-5 of FIG. 4.

Instead of having a land around the periphery of the filter 12 or around regions of the top surface of the filter 12, the header can be formed as shown in FIGS. 4 and 5 by a pattern of slots 30 milled across the top of the filter to leave, in this example, triangular lands 31.

The attenuation of concentration of cesium down a long straight cylindrical pipe for infinite sing behaviour at the walls is given by, $$C = C_o \exp - \frac{2kx}{rv} \quad (1)$$

where
C is the concentration of cesium at $x$,
$C_o$ is the concentration of cesium at $x=0$,
$k$ is the mass transfer coefficient for cesium,
$x$ is the distance down the pipe,
$r$ is the radius of the pipe,
$v$ is the velocity of the coolant along the pipe.
The decontamination factor is given by:

$$\frac{C_o}{C} = \exp \frac{2kx}{rv} \quad (2)$$

If it is assumed that the whole of the bottom of the core is covered by a structure as shown in FIG. 2, the velocity $v$ of the coolant in the pipes is given by:

$$V = \frac{M}{\pi R^2 \rho f} \quad (3)$$

where
M is the total coolant mass flow,
R is the radius of the core,
$\rho$ is the density of the coolant at core exit temperature,
$f$ is the fractional free flow area of the filter structure, given by:

$$f = \frac{\pi r^2}{2\sqrt{3}(r+t)^2} \quad (4)$$

with $r$ and $t$ as shown in FIG. 2. Three values of $f$ will be used later equivalent to the following conditions:

| | |
|---|---|
| $r=t$, | $f=.227$ |
| $r=1.5t$, | $f=.326$ |

-continued

| $r=2.0t$, | $f=.403$ |
|---|---| and also as a limiting condition $f=1$.

The Reynolds number for the coolant flowing through one of these pipes is given by:

$$Re = \frac{2Mr}{\rho f \pi R^2} \quad (5)$$

where $\mu$ is the viscosity of the coolant. This expression has been evaluated for a range of values of $f$ and $r$ and is plotted in FIG. 6 which is a graph of Reynolds number Re as a function of radius $r$ (in meter) and fractional free flow area $f$. For the majority of values of $f$ and $r$ of interest the flow down the pipes is turbulent.

For turbulent flow, by analogy with heat transfer, the mass transfer coefficient $k$ can be represented by:

$$k = \frac{0.0115 \, D \, Re^{.8} \, Sc^{.4}}{r} \quad (6)$$

where D is the diffusion coefficient of cesium in the coolant, Sc is the Schmidt number for cesium in the coolant.

$$Sc = \frac{\mu}{\rho D} \quad (7)$$

Substituting in (2) we have $$\frac{C_o}{C} = \exp\left[5.03 \cdot 10^{-2} \times \left(\frac{f}{M}\right)^{.2} \left(\frac{R}{\mu}\right)^{.4} \frac{(\rho D)^{.6}}{r^{1.2}}\right] \quad (8)$$

Figure 7:
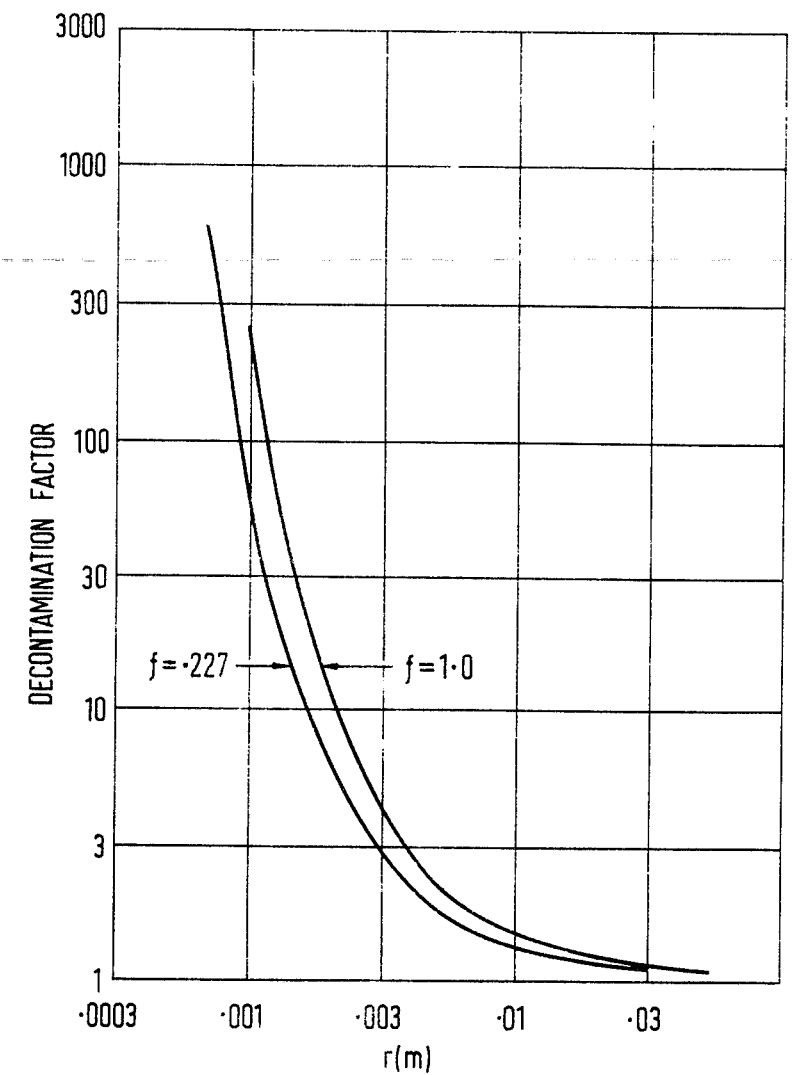

This expression has been evaluated for a range of values of $r$ and $f$ using the parameter values listed in Table 1. The results are shown in FIG. 7, which is a graph of decontamination factor as a function of $r$ and $f$.

Table 1

| Total core mass flow | M | 700 kg.s⁻¹ |
|---|---|---|
| Core radius | R | 3.75 m |
| Length of filter structure | x | 1 m |
| *Diffusion coefficient of cesium in helium | D | 5×10⁻⁶ m²s⁻¹ |
| *Density of helium | ρ | 2.46 kg.m⁻³ |
| *Viscosity of helium | μ | 4.85×10⁻⁵ kg.m⁻¹.s⁻¹ |

*These values were evaluated at a pressure of 55 b and a temperature of 800° C.

The pressure drop associated with the filter will have three components. Inlet pressure drop, outlet pressure drop and friction loss down the pipes.

The friction loss down a pipe is given by:

$$\Delta p = \frac{c \times \rho \, v^2}{r} \quad (9)$$

where $\Delta p$ is the pressure drop along pipe length $x$, $c$ is the coefficient of skin friction.

Figure 6:
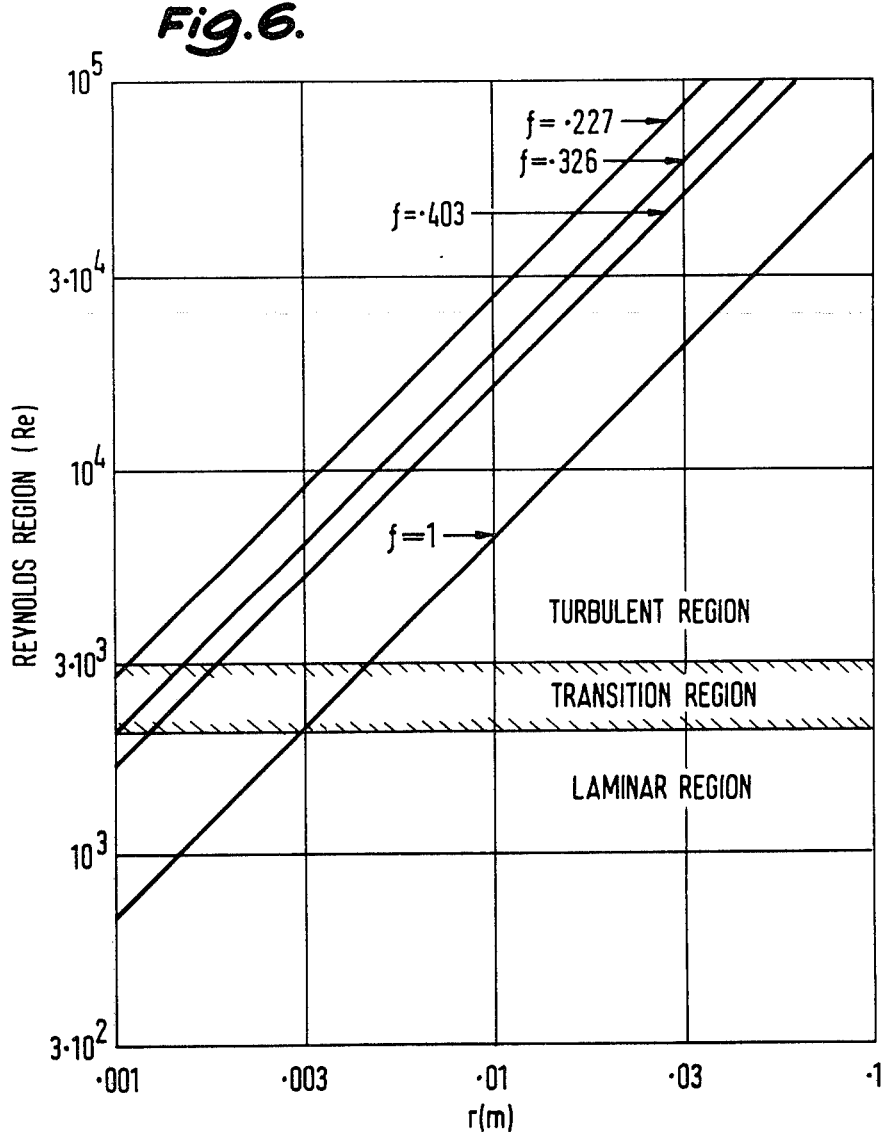
FIGS. 6, 7 and 8 are graphical diagrams.

It can be seen from FIG. 6 that for the majority of values of $r$ and $f$ of interest the flow down the pipes is turbulent. The value of the skin friction coefficient $c$, depends on the surface roughness and Reynolds number, a value for $c$ of .01 will be assumed for the following calculations. This value is slightly higher than that suggested for very rough pipes and as such is pessimistic.

Rewriting (9) we have:

$$\Delta p = \frac{c \times M^2}{\rho \, r \pi^2 \, R^4 \, f^2} \quad (10)$$

Figure 8:
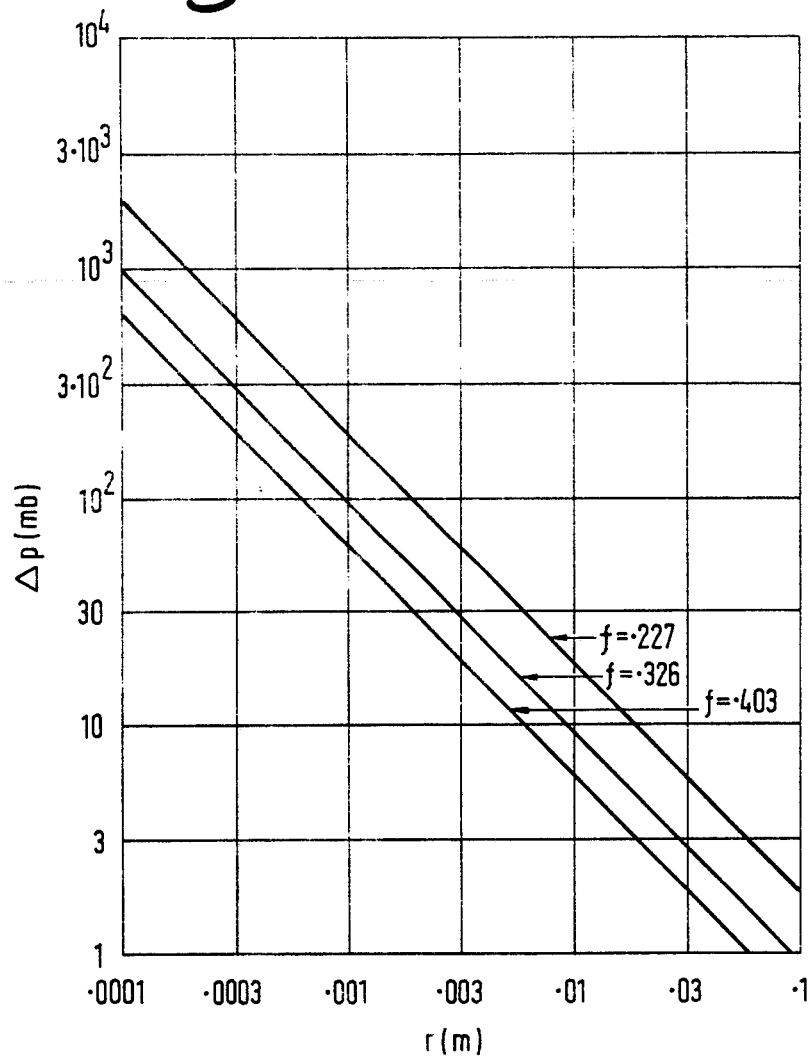

This expression has been evaluated for a range of values of $r$ and $f$, and is plotted in FIG. 8 which is a graph of $\Delta p$ as a function of $r$ for different values of $f$.

Inlet and outlet pressure drops may be estimated from the velocity of the coolant and the fractional free flow areas using:

$$\Delta p(\text{inlet}) = \tfrac{1}{4}\rho v^2_{(\text{inlet})}(1-f)$$

$$\Delta p(\text{outlet}) = \tfrac{1}{2}\rho v^2_{(\text{outlet})}(1-f)^2$$

where $v_{(\text{inlet})}$ is the velocity of the coolant before entering the filter, $v_{(\text{outlet})}$ is the velocity of the coolant before leaving the filter.

Values of $\Delta p$ inlet and outlet are given in table 2.

Table 2

| f | .227 | .326 | .403 |
|---|---|---|---|
| Δp inlet (mb) | .20 | .17 | .15 |
| Δp outlet (mb) | 5.9 | 2.2 | 1.1 |

If a cesium filter is to be effective it must be able to retain any cesium it removes until it can be changed.

Two possibilities exist, one that the filter is incorporated as part of the fuel block structure and is changed after approximately three years, the other, that the filter remains in the core for the reactor lifetime of approximately 30 years.

The effective diffusion coefficient Dg for cesium in graphite is given by $$\log_{10} D_g = -5.28 - \frac{5450}{T} \quad \text{(in the concentration range 0 - 30 } \mu\text{g/g)}.$$

(in the concentration range 0–30 μg/g) where, T is the temperature of the graphite °K. from which the diffusion coefficient at 800° C is:

$$4.37 \times 10^{-11} \, m^2.s^{-1}$$

Using this figure it is possible to calculate the random walk distance $$x = \sqrt{Dt}$$

for times of 3 and 30 years.

$$x(3 \text{ years}) = 6.4 \times 10^{-2} \, m$$

$$x(30 \text{ years}) = 2.0 \times 10^{-1} \, m.$$

Since the size of ligaments considered is from .003 to .03 m it can be assumed that any cesium deposited on the surface of the filter channels will quickly disperse uniformly across the ligaments.

A release rate for cesium-137 of 10 Ci.yr$^{-1}$ is equivalent to an average gas concentration of $2.3 \times 10^7$ atoms.g$^{-1}$ or an equilibrium cesium on graphite concentration of 3.8 $\mu$g/g.

The total mass of graphite in the filter structure is $$\pi R^2 \, l(1-f)\rho_{(graphite)}$$

or approximately 40,000 kg.

The filter is therefore capable of holding 152 g of cesium or 13 k Ci of cesium-137 compared with a release rate of 10 ci.yr$^{-1}$ for 30 years, or 300 Ci.

The amount of cesium the filter can hold is a function of temperature, a reduction of the temperature by 50° C is worth a factor of 15 on the equilibrium cesium burden on the reflector.

We claim:

1. In a gas cooled nuclear reactor having a core assembly through which a coolant gas is passed and energy extracting means for extracting energy from said gas; the improvement comprising a filter arranged in the gas path from the core to the energy extracting means so that the whole of the coolant gas from the core passes through the filter before passing to said energy extracting means, which filter comprises a graphite body having a plurality of holes therein with a hydraulic diameter between 1 and 6 mm and a ratio of length to hydraulic diameter between 170 and 1000, said holes providing passages for the coolant gas leaving the reactor core.

2. A gas cooled nuclear reactor as claimed in claim 1 wherein the holes are circular.

3. A gas cooled nuclear reactor as claimed in claim 1 and having vertical channels through the core with a graphite reflector block at the gas inlet end of the core and wherein said filter is arranged also to act as a neutron reflector at outlet end of the core.

4. A gas cooled nuclear reactor as claimed in claim 1 wherein said graphite body comprises a plurality of graphite blocks with holes for passage of gas.

5. A gas cooled nuclear reactor as claimed in claim 1 wherein header means are provided between the gas outlets from the core and the inlets to the passages through the filter.

6. A gas cooled nuclear reactor as claimed in claim 5 wherein the filter is provided with at least one land to space part of the end face of the filter away from the core thereby forming said header means.

7. A gas cooled nuclear reactor as claimed in claim 5 wherein said filter has a pattern of slots across its inlet face opening into the holes through the filter.

* * * * *